US012504992B2

(12) United States Patent
Niu

(10) Patent No.: US 12,504,992 B2
(45) Date of Patent: Dec. 23, 2025

(54) ARTIFICIAL INTELLIGENCE CHIP AND DATA PROCESSING METHOD BASED ON ARTIFICIAL INTELLIGENCE CHIP

(71) Applicant: Shenzhen Corerain Technologies Co., Ltd., Guangdong (CN)

(72) Inventor: Xinyu Niu, Guangdong (CN)

(73) Assignee: Shenzhen Corerain Technologies Co., Ltd., Shenzhen (CN)

( * ) Notice: Subject to any disclaimer, the term of this patent is extended or adjusted under 35 U.S.C. 154(b) by 585 days.

(21) Appl. No.: 18/011,522

(22) PCT Filed: Jun. 16, 2021

(86) PCT No.: PCT/CN2021/100362
§ 371 (c)(1),
(2) Date: Dec. 19, 2022

(87) PCT Pub. No.: WO2021/259104
PCT Pub. Date: Dec. 30, 2021

(65) Prior Publication Data
US 2023/0281045 A1 Sep. 7, 2023

(30) Foreign Application Priority Data
Jun. 22, 2020 (CN) .......................... 202010576743.9

(51) Int. Cl.
*G06F 9/50* (2006.01)
(52) U.S. Cl.
CPC ................................. *G06F 9/5027* (2013.01)

(58) Field of Classification Search
CPC ..... G06F 9/5027; G06F 15/173; G06N 3/063; G06N 3/0464; G06N 3/044; G06N 3/045
See application file for complete search history.

(56) References Cited

U.S. PATENT DOCUMENTS

| | | | | |
|---|---|---|---|---|
| 2019/0050265 A1* | 2/2019 | Vijayaraghavan | ....... | G06N 3/08 |
| 2019/0378006 A1* | 12/2019 | Fukuda | ..................... | G06N 3/08 |
| 2020/0174840 A1* | 6/2020 | Zhao | ..................... | G06F 9/5011 |
| 2020/0250539 A1* | 8/2020 | Liu | ..................... | G06N 3/044 |
| 2022/0051088 A1* | 2/2022 | Meng | ..................... | G06F 9/5027 |

FOREIGN PATENT DOCUMENTS

| | | |
|---|---|---|
| CN | 110046704 A | 7/2019 |
| CN | 110991634 A | 4/2020 |

OTHER PUBLICATIONS

International Search Report of PCT Patent Application No. PCT/CN2021/100362 issued on Sep. 24, 2021.

* cited by examiner

*Primary Examiner* — Peng Ke

(57) ABSTRACT

Embodiments of the present disclosure provide an artificial intelligence chip and a data processing method based on an artificial intelligence chip. The artificial intelligence chip includes: a plurality of computing modules; each computing module is configured to process data on the basis of one of operation nodes corresponding to artificial intelligence algorithms, and the plurality of computing modules are connected in turn according to an operation order of the artificial intelligence algorithms; and the data flows, according to a preset data flowing direction, in a data stream network formed by the plurality of computing modules.

8 Claims, 4 Drawing Sheets

ARTIFICIAL INTELLIGENCE CHIP AND DATA PROCESSING METHOD BASED ON ARTIFICIAL INTELLIGENCE CHIP

This application claims priority to China Patent Application No. 202010576743.9, filed on Jun. 22, 2020 in China National Intellectual Property Administration, the disclosure of which is herein incorporated by reference in its entirety.

TECHNICAL FIELD

Embodiments of the present disclosure relate to the technical field of artificial intelligence, for example, to an artificial intelligence chip and a data processing method based on an artificial intelligence chip.

BACKGROUND

With the rapid development of artificial intelligence, many artificial intelligence chips for computing artificial intelligence learning models have appeared on the market.

At present, commonly used artificial intelligence chips acquire data by means of instruction sets and process the data according to an operation rule of an artificial intelligence algorithm.

However, acquiring data by means of instruction sets consumes resources of the artificial intelligence chips, resulting in low resource utilization rate of the artificial intelligence chips.

SUMMARY

Embodiments of the present disclosure provides an artificial intelligence chip and a data processing method based on an artificial intelligence chip, so as to achieve an effect of increasing the resource utilization rate of an artificial intelligence chip.

In a first aspect, an embodiment of the present disclosure provides an artificial intelligence chip, including:
 a plurality of computing modules, each computing module being configured to process data on the basis of one of operation nodes corresponding to artificial intelligence algorithms, and the plurality of computing modules being connected in turn according to an operation order of the artificial intelligence algorithms;
 wherein the data flows, according to a preset data flowing direction, in a data stream network formed by the plurality of computing modules.

Optionally, the artificial intelligence chip further includes a data stream dam; the data stream dam is arranged between a previous computing module and a next computing module among the plurality of computing modules, and is configured to receive first data output by the previous computing module when a bandwidth of the previous computing module does not match a bandwidth of the next computing module, and send the first data to the next computing module according to a bandwidth matched with the bandwidth of the next computing module.

Optionally, the previous computing module and the next computing module are adjacent or not adjacent.

Optionally, the artificial intelligence chip further includes:
 a local data stream storage module, the local data stream storage module being at least connected with a first computing module and a last computing module among the plurality of computing modules, and configured to send the data to the data stream network for processing by means of the first computing module, and/or receive a processing result output by the last computing module.

Optionally, the data stream dam includes a write end, a read end, a full-load end and a no-load end, and further includes:
 a first AND gate, connected with the write end to represent an uplink valid end, the uplink valid end being configured to receive a first valid signal sent by the previous computing module;
 a second AND gate, connected with the read end to represent a downlink permission end, the downlink permission end being configured to receive a second valid signal sent by the next computing module;
 a first NOT gate, connected with the full-load end to represent an uplink permission end, the uplink permission end being configured to send a first permission signal to the previous computing module and the first AND gate; and
 a second NOT gate, connected with the no-load end to represent a downlink valid end, the downlink valid end being configured to send a second valid signal to the next computing module and the second AND gate.

Optionally, the data stream network is a local data stream network; there are a plurality of local data stream networks; the plurality of local data stream networks form one global data stream network; and the artificial intelligence chip further includes:
 a global data stream storage module, the global data stream storage module being connected with the plurality of local data stream networks; and the global data stream storage module being configured to transmit data to the local data stream networks or transmit second data output by a previous local data stream network to a next local data stream network.

Optionally, there is one global data stream storage module; and the plurality of local data stream networks are respectively connected with the global data stream storage module.

In a second aspect, an embodiment of the present disclosure provides a data processing method based on an artificial intelligence chip, which is applied to the artificial intelligence chip of any embodiment of the present disclosure. The method includes:
 at the beginning of processing of data to be processed, determining a target artificial intelligence model used for processing the data to be processed;
 matching a data stream network and a preset data flowing direction corresponding to the target artificial intelligence model to the artificial intelligence chip;
 processing the data to be processed on the basis of the artificial intelligence chip matched with the data stream network and the data flowing direction.

Optionally, the step of matching a data stream network and a preset data flowing direction corresponding to the target artificial intelligence model to the artificial intelligence chip includes:
 determining algorithm information corresponding to the target artificial intelligence model; and
 matching, according to the algorithm information, the data stream network and the data flowing direction corresponding to the target artificial intelligence model to the artificial intelligence chip.

Optionally, the algorithm information includes computing content, input/output information and an operation order; and the step of matching, according to the algorithm information, the data stream network and the data flowing direction corresponding to the target artificial intelligence model to the artificial intelligence chip includes:

matching a data stream module according to the computing content, the data stream module at least including a computing module;

matching a connection relationship of the data stream module according to the input/output information to form the data stream network; and matching the data flowing direction of the data to be processed in the data stream network according to the operation order.

The artificial intelligence chip of the embodiment of the present disclosure includes a plurality of computing modules, each of which is configured to process data on the basis of one of operation nodes corresponding to artificial intelligence algorithms, and the plurality of computing modules are connected in turn according to an operation order of the artificial intelligence algorithms. The data flows, according to a preset data flowing direction, in a data stream network formed by the plurality of computing modules, thus solving the problem of a low resource utilization rate of the artificial intelligence chip caused by the fact that acquiring data by means of instruction sets consumes resources of the artificial intelligence chip, and achieving an effect of increasing the resource utilization rate of the artificial intelligence chip.

DETAILED DESCRIPTION

Figure 1:
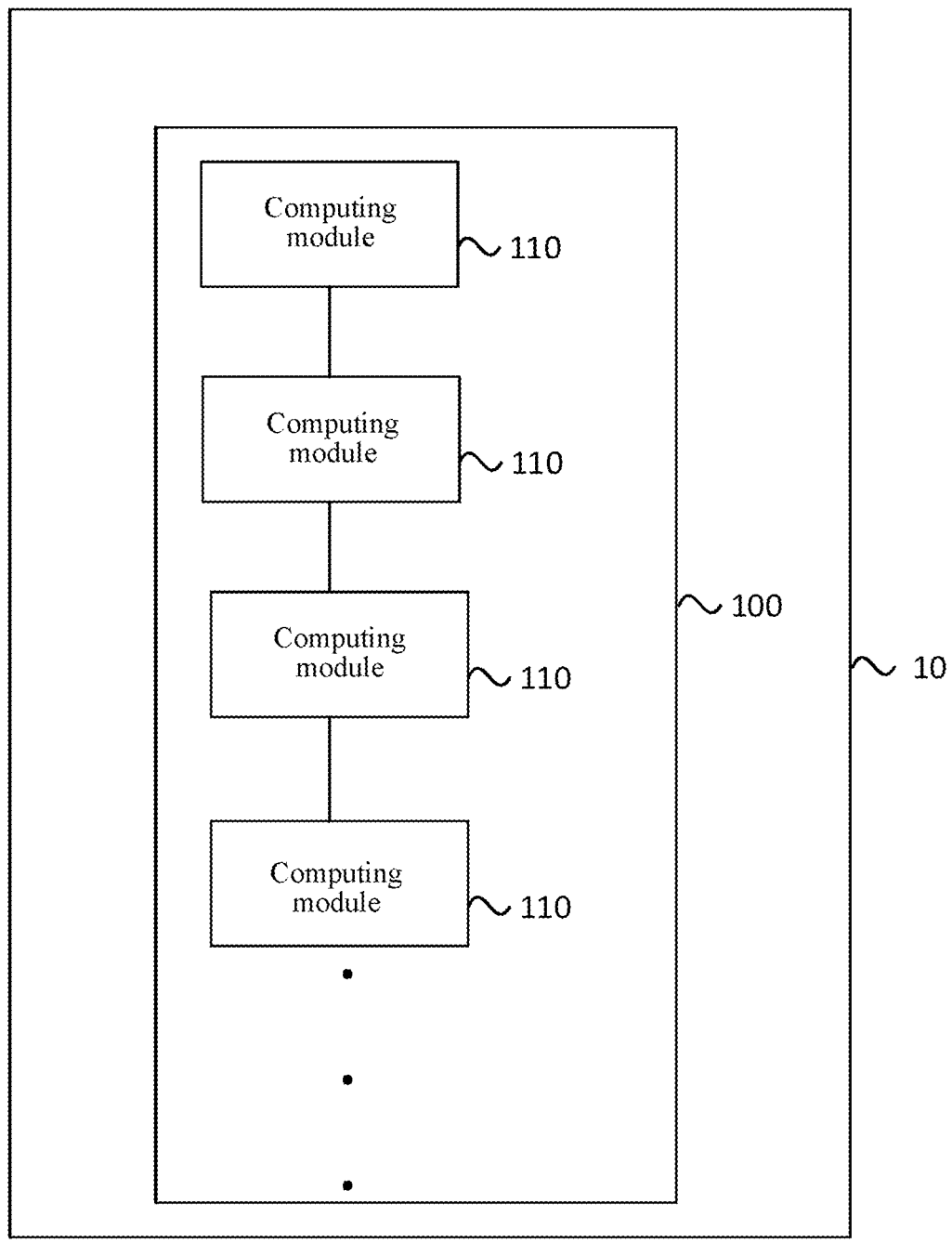
FIG. 1 is a schematic structural diagram of an artificial intelligence chip provided by Embodiment 1 of the present disclosure.

The present disclosure is further described in detail below with reference to accompanying drawings and embodiments. It may be understood that specific embodiments described herein are only used to explain the present disclosure, but not to limit this present disclosure. In addition, it should be further noted that, for ease of description, the accompanying drawings only show parts relevant to this disclosure rather than the entire structure.

Some exemplary embodiments are described as processing or methods depicted as in the flow diagram. Although the flow diagram describes the steps as sequential processing, many of them can be implemented in parallel, concurrently, or simultaneously. In addition, the order of the steps can be rearranged. The processing may be terminated when its operation is completed, but there may be also additional steps not included in the drawings. Processing can correspond to methods, functions, procedures, subroutines, computer subprograms, and the like.

In addition, terms "first", "second" may be used to describe various directions, motions, steps, or elements in this specification, but these directions, motions, steps, or elements are not limited by the terms. The terms are only used for distinguishing one direction, motion, step, or element from another direction, motion, step, or element. For example, without departing from the scope of the present disclosure, first data can be referred to as second data, and similarly, second data can be referred as first data. Both the first data and the second data are data, but they do not refer to the same data. The terms "first" and "second" should not be construed as indicating or implying relative importance or implicitly indicating the number of technical features indicated. Therefore, features defining "first" and "second" may explicitly or implicitly include one or more such features. In the description of this application, "a plurality of" means at least two, such as two and three unless it is specifically defined otherwise.

Embodiment 1

FIG. 1 is a schematic structural diagram of an artificial intelligence chip provided by Embodiment I of the present disclosure. As shown in FIG. 1, this embodiment of the present disclosure provides an artificial intelligence chip 10, including a plurality of computing modules 110.

Each computing module 110 is configured to process data on the basis of one of operation nodes corresponding to artificial intelligence algorithms, and the plurality of computing modules 110 are connected in turn according to an operation order of the artificial intelligence algorithms, wherein the data flows, according to a preset data flowing direction, in a data stream network 100 formed by the plurality of computing modules 110.

In this embodiment, each computing module 110 in the artificial intelligence chip 10 processes data according to the operation node corresponding to the artificial intelligence algorithm, and is connected in turn according to the operation order of the artificial intelligence algorithms to form the data stream network 100 suitable for computing the data according to the artificial intelligence algorithm. Specifically, the computing module 110 includes, but is not limited to, a computing function such as operation convolution, pooling, activation or full connection, and can be configured with a computing function matched with the operation node of the artificial intelligence algorithm as required. The artificial intelligence algorithm of this embodiment includes, but is not limited to, a CNN algorithm and a Recurrent Neural Network (RNN) algorithm.

The CNN algorithm used as the artificial intelligence algorithm is taken as an example. The CNN algorithm includes computation of a convolutional layer, computation of a pooling layer and computation of a fully connected layer. The operation order is computation in the convolutional layer, computation in the pooling layer and computation in the fully connected layer. The operation node may be a node for computation in the convolutional layer, the pooling layer and the fully connected layer. The plurality of computing modules 110 perform convolutional computation, pooling computation and fully-connected computation respectively, and are connected end to end according to an operation order of the CNN algorithm. The data flows in the plurality of computing modules 110 according to the operation order of the artificial intelligence algorithms, so that the data can be processed in the chip by means of a data stream using the artificial intelligence algorithm. It can be understood that the data can flow in the chip by itself by means of the data stream. The computing modules 110 do not need to perform a data acquisition action, but only need to process the data until the data arrives at the computing modules according to the preset data flowing direction, which reduces the instruction overhead and increases the resource utilization rate of the chip.

Figure 2:
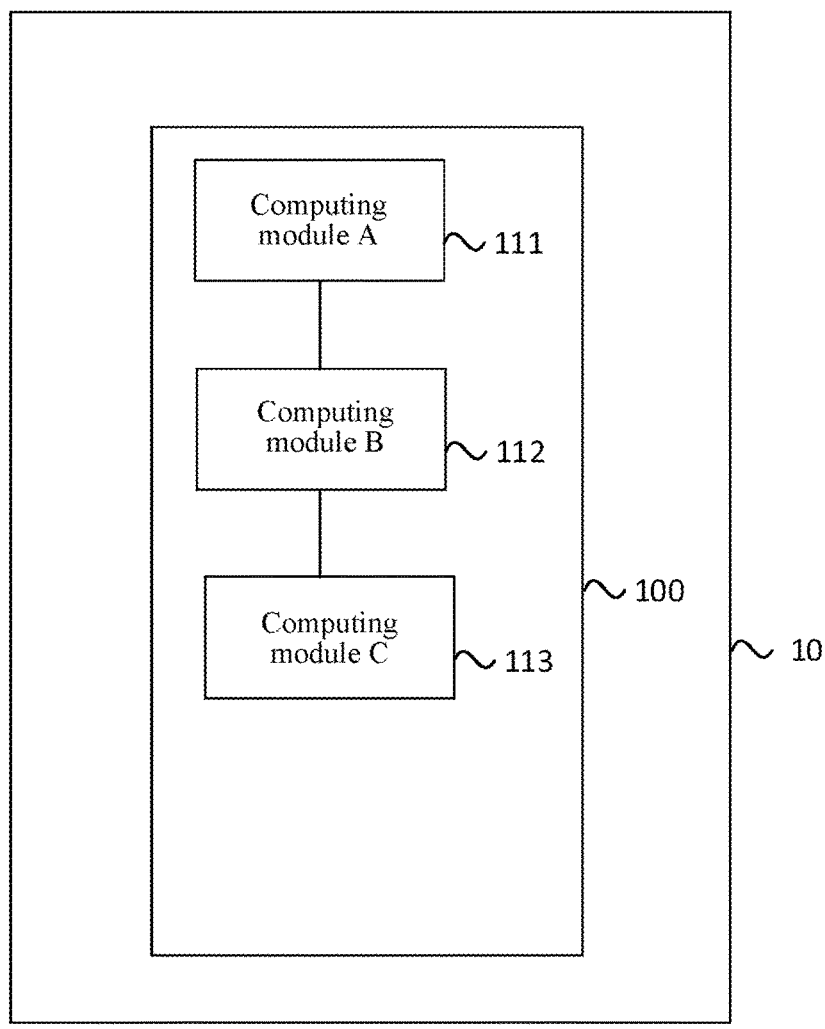
FIG. 2 is a schematic structural diagram of an artificial intelligence chip for operating a Convolutional Neural Network (CNN) algorithm provided by Embodiment 1 of the present disclosure.

Referring to FIG. 2, FIG. 2 is a schematic structural diagram of an artificial intelligence chip for operating a CNN algorithm provided by this embodiment of the present disclosure. It can be seen through FIG. 2 that the artificial intelligence chip 10 includes a computing module A111, a computing module B112 and a computing module C113. The computing module A111 is configured to perform convolutional computation. The computing module B112 is configured to perform pooling computation. The computing module C113 is configured to perform fully-connected computation. The preset data flowing direction is from the computing module A111 to the computing module B112 to the computing module C113. It can be understood that image data flows in the computing module A111, the computing module B112 and the computing module C113 according to the preset data flowing direction. When the image data reaches the computing module A111, the convolutional computation is performed. After the computation is completed, the image data reaches the computing module B112 for pooling computation. Finally, the image data reaches the computing module C113 for fully-connected computation, and a final computing result is output. The final computing result can be saved in an off-chip memory outside the artificial intelligence chip 10, which is not specifically limited here.

Specifically, in some scenarios, the first data obtained by data processing by a previous computing module 114 needs to be sent to a next computing module 115 for the next computing module 115 to use the first data for computation. However, when a bandwidth of the previous computing module 114 and a bandwidth of the next computing module 115 do not match, for example, when the bandwidth of the previous computing module 114 is greater than the bandwidth of the previous computing module 115, the data received by the next computing module 115 will quickly overflow.

Figure 3:
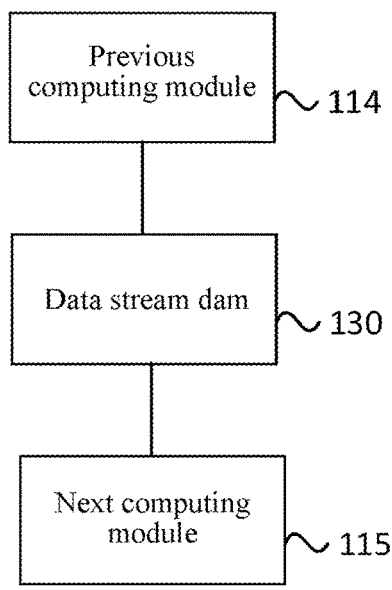
FIG. 3 is a partially schematic structural diagram of an artificial intelligence chip provided by Embodiment 1 of the present disclosure.

Referring to FIG. 3, FIG. 3 is a partially schematic structural diagram of an artificial intelligence chip provided by an embodiment of the present disclosure. In this embodiment, the artificial intelligence chip 10 further includes a data stream dam 130. The data stream dam 130 is arranged between the previous computing module 114 and the next computing module 115 among the plurality of computing modules 110, and is configured to receive the first data output by the previous computing module 114 when the bandwidth of the previous computing module 114 does not match the bandwidth of the previous computing module 115, and send the first data to the next computing module 115 according to the bandwidth matched with the bandwidth of the previous computing module 115.

Specifically, the previous computing module 114 and the next computing module 115 of this embodiment only represent the computing modules 110 that require data interaction with each other, but are not limited to specific computing modules 110, which can be determined according to different situations. Optionally, the previous computing module 114 and the next computing module 115 are adjacent or not adjacent, which are not specifically limited here.

It can be understood that when the bandwidth of the previous computing module 114 and the bandwidth of the next computing module 115 do not match, the data stream dam 130 receives the first data output by the previous computing module 114, and sends the first data to the next computing module 115 according to the bandwidth matched with the previous computing module 115, thus ensuring a data balance of data interaction between the previous computing module 114 and the previous computing module 115. Thus, data processing can be performed normally to avoid data loss caused by a clock cycle disorder.

Specifically, in order to realize automatic stream control between the previous computing module 114 and the next computing module 115 through the data stream dam 130, a basic idea is as follows:
A) input data rate (F_in)=number of valid input data/unit time (T_d)
B) output data rate (F_out)=number of valid output data/unit time (T_d)
C) during the whole operation, if F_in==F_out, then
in order to completely avoid back pressure: the data stream dam 130 should be able to store max(F_in)−min(F_out) data. The data stream dam 130 combines internal states of the previous computing module 114 and the previous computing module 115. It is purely up to hardware to decide whether to stream data from the previous computing module 114. Therefore, the data stream dam 130 can be understood as a barrier for regulating data streams. Based on the requirements of the algorithm, the data stream dam 130 is further extended to support predetermined static traffic control.

Optionally, the data stream dam 130 includes a write end, a read end, a full-load end and a no-load end, and further includes:
a first AND gate, connected with the write end to represent an uplink valid end, the uplink valid end being configured to receive a first valid signal sent by the previous computing module 114;
a second AND gate, connected with the read end to represent a downlink permission end, the downlink permission end being configured to receive a second valid signal sent by the previous computing module 115;
a first NOT gate, connected with the full-load end to represent an uplink permission end, the uplink permission end being configured to send a first permission signal to the previous computing module 114 and the first AND gate; and
a second NOT gate, connected with the no-load end to represent a downlink valid end, the downlink valid end being configured to send a second valid signal to the next computing module 115 and the second AND gate.

Specifically, the previous computing module 114 is configured to receive the first permission signal sent by the data stream dam 130.

The previous computing module 114 provides the first valid signal to the data stream dam 130 to write the first data in the data to be processed to the data stream dam 130. The previous computing module 114 is configured to process the first data according to a processing method pointed by the operation node to obtain the computing result, wherein the first data is data in the data to be processed, which is applicable to computation by the previous computing module 114.

The data stream dam 130 is configured to receive the second permission signal sent by the previous computing module 115.

The data stream dam 130 provides a second valid signal to the next computing module 115 to write the computing result to the previous computing module 115.

In this embodiment, the previous computing module 114 receives the first permission signal sent by the data stream dam 130, which means that the data stream dam 130 is ready to receive the data to be written to the previous computing module 114. After the previous computing module 114 receives the first permission signal sent by the data stream dam 130, the previous computing module 114 can read the computing result. The previous computing module 114 provides the first valid signal to the data stream dam 130, which means that the previous computing module 114 can write the computing result to the data stream dam 130. After the data stream dam 130 receives the first valid signal sent by the previous computing module 114, the data stream dam 130 can write the computing result.

When the previous computing module 114 receives the first permission signal sent by the data stream dam 130, and the data stream dam 130 also receives the first valid signal sent by the previous computing module 114, the computing result starts to be written to the data stream dam 130 from the previous computing module 114. When any signal stops being sent, that is, when the data stream dam 130 stops sending the first permission signal to the previous computing module 114 or the previous computing module 114 stops sending the first valid signal to the data stream dam 130, the transmission of this communication will stop immediately. At this time, the computing result has been written to the data stream dam 130 from the previous computing module 114, and the data stream dam 130 stores the computing result. When the data stream dam 130 receives the first permission signal sent by the previous computing module 115, that is, the next computing module 115 is ready to receive the data to be written in the data stream dam 130. After the data stream dam 130 receives the second permission signal sent by the previous computing module 115, the data stream dam 130 can read the computing result. When the data stream dam 130 provides the second valid signal to the previous computing module 115, the data stream dam 130 can write the computing result to the previous computing module 115. After the next computing module 115 receives the second valid signal sent by the data stream dam 130, the next computing module 115 can write the computing result.

When the data stream dam 130 receives the first permission signal sent by the previous computing module 115, and the next computing module 115 also receives the second valid signal sent by the data stream dam 130, the computing result starts to be written to the next computing module 115 from the data stream dam 130. When any signal stops being sent, that is, when the next computing module 115 stops sending the second permission signal to the data stream dam 130 or the data stream dam 130 stops sending the second valid signal to the previous computing module 115, the transmission of this communication will stop immediately. Thus, the transmission of the computing result from the previous computing module 114 to the next computing module 115 is completed. In addition, it should be noted that the computing result does not refer to a sequential computing result, but can be any piece of data in the actual communication.

Figure 4:
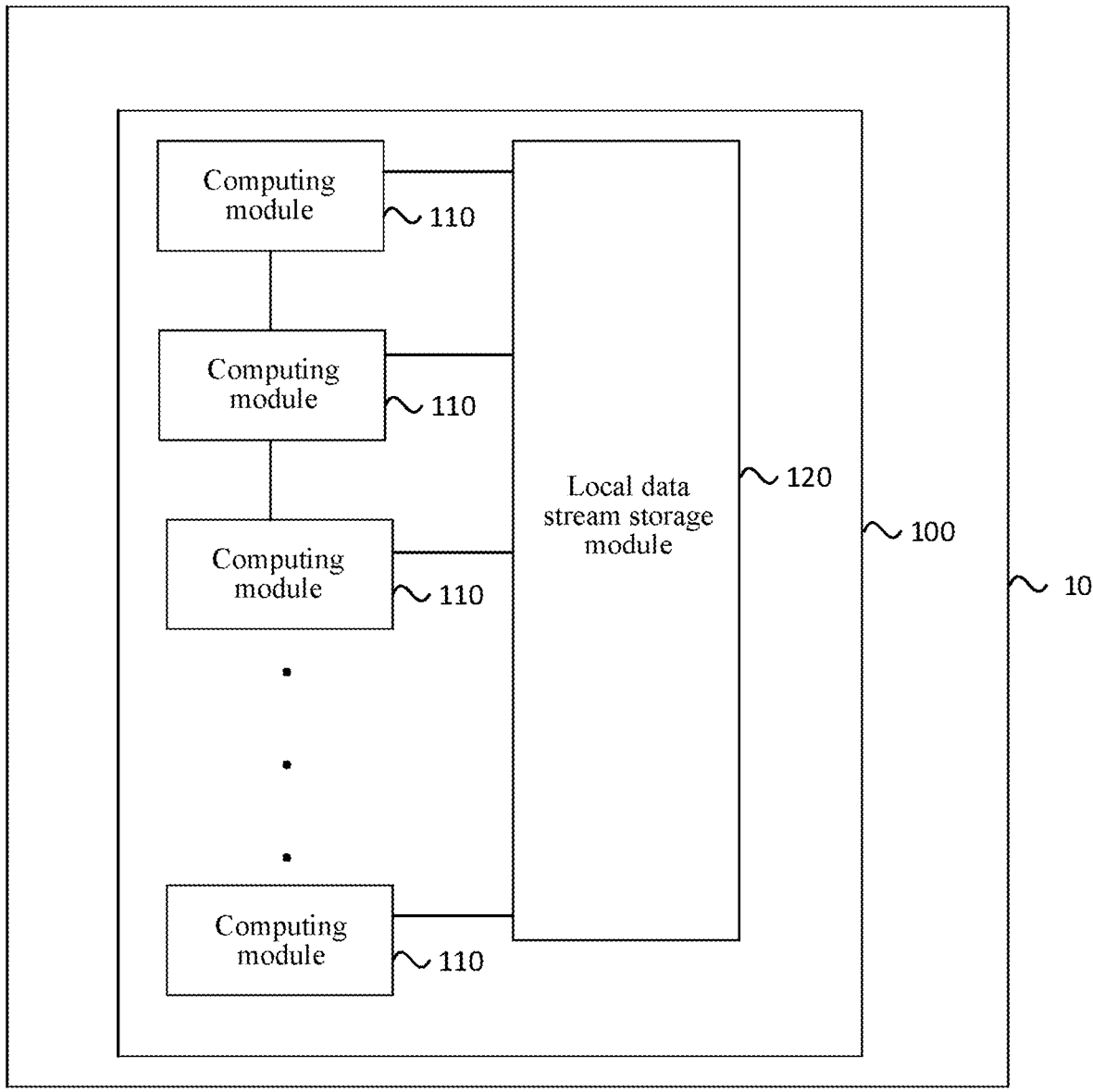
FIG. 4 is a schematic structural diagram of another artificial intelligence chip provided by Embodiment 1 of the present disclosure.

Referring to FIG. 4, FIG. 4 is a schematic structural diagram of another artificial intelligence chip provided by an embodiment of the present disclosure. In one embodiment, the artificial intelligence chip also includes a local data stream storage module 120. The local data stream storage module 120 is at least connected with a first computing module 110 and a last computing module 110 in a data pipeline formed by the plurality of computing modules 110, and is configured to send the data to the data stream network for processing by means of the first computing module 110, and/or receive a processing result output by the last computing module 110.

Specifically, the preset data flowing direction is controlled by a routing switch in the data stream network. The local data stream storage module 120 programmatically stores and outputs data with a predefined sequence. The sequential data is sent to each computing module 110 of the data pipeline in the data stream network 100 through the first computing module 110, and a data flowing direction is controlled through the routing switch in the data stream network. When the computation is completed in the data stream network 100, the computing result output through the last computing module 110 is stored in the local data stream storage module 120.

Figure 5:
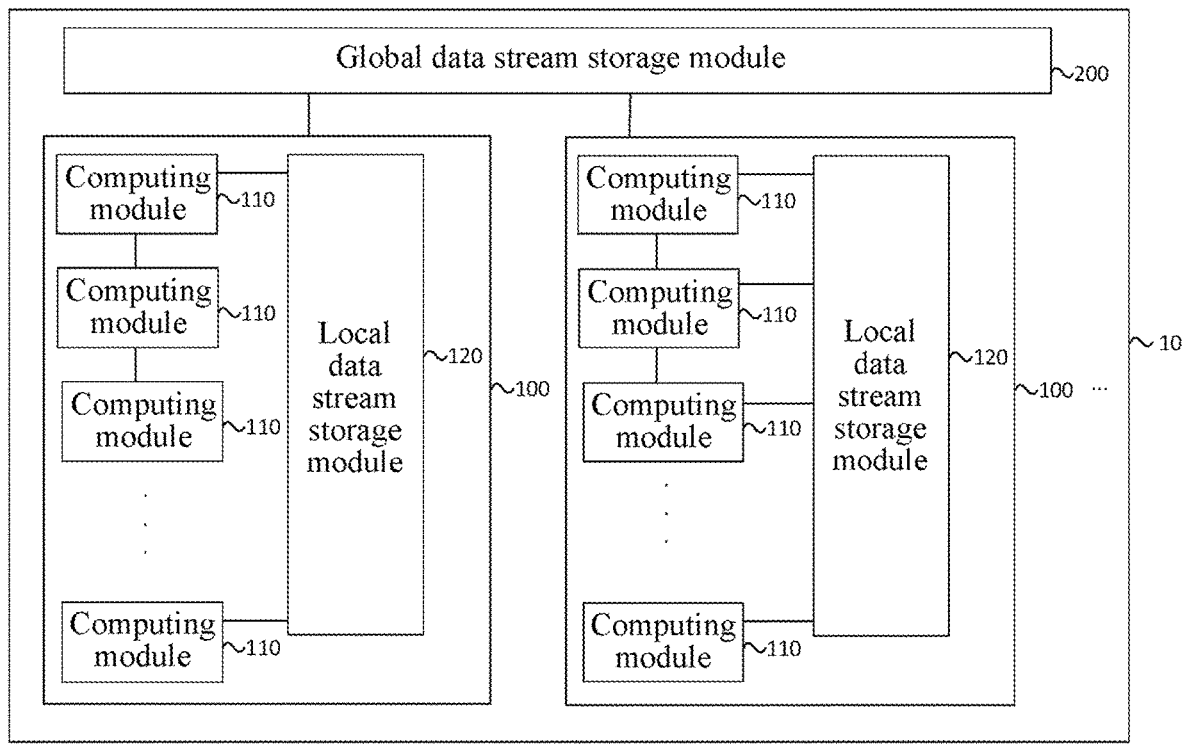
FIG. 5 is a schematic structural diagram of another artificial intelligence chip provided by Embodiment 1 of the present disclosure.

Referring to FIG. 5, FIG. 5 is a schematic structural diagram of another artificial intelligence chip provided by an embodiment of the present disclosure. In one embodiment, the data stream network 100 is a local data stream network 100. There are a plurality of local data stream networks 100. The plurality of local data stream networks 100 form one global data stream network. The artificial intelligence chip 10 further includes:

a global data stream storage module 200, the global data stream storage module 200 being connected with the plurality of local data stream networks 100, and the global data stream storage module 200 being configured to transmit data to the local data stream networks 100 or transmit second data output by a previous local data stream network 100 to a next local data stream network 100.

In this embodiment, specifically, each data stream network 100 performs data processing corresponding to one artificial intelligence algorithm.

It should be noted that in the process of data processing by the artificial intelligence chip 10, it may be parallel computation performed by a plurality of artificial intelligence algorithms, and one independent computation may be performed in one local data stream network 100. The global data stream storage module 200 can be used as a container for providing data for each local data stream network 100, and can also transmit the second data output by the previous local data stream network 100 to the next local data stream network 100. In this embodiment, an internal condition of each local data stream network 100 can refer to the description of any embodiment, which will not repeatedly described in detail in this embodiment. Optionally, there is one global data stream storage module 200. The plurality of local data stream networks 100 are respectively connected with the global data stream storage module 200. Optionally, the global data stream module 200 can also be used as a connection window between the artificial intelligence chip 10 and the off-chip memory.

In the technical solution of this embodiment of the present disclosure, the artificial intelligence chip includes a plurality of computing modules, each of which is configured to process data on the basis of one of operation nodes corresponding to artificial intelligence algorithms; the plurality of computing modules are connected in turn according to an operation order of the artificial intelligence algorithms. The data automatically flows in a data stream network according to a data flowing direction, thus avoiding the instruction overhead and achieving the technical effect of increasing the resource utilization rate of the artificial intelligence chip. In addition, by means of arranging the local data stream storage module between the two computing modules that require data interaction and do not match in bandwidth, data can be accurately transmitted for computation even if the bandwidths do not match.

Embodiment 2

Figure 6:
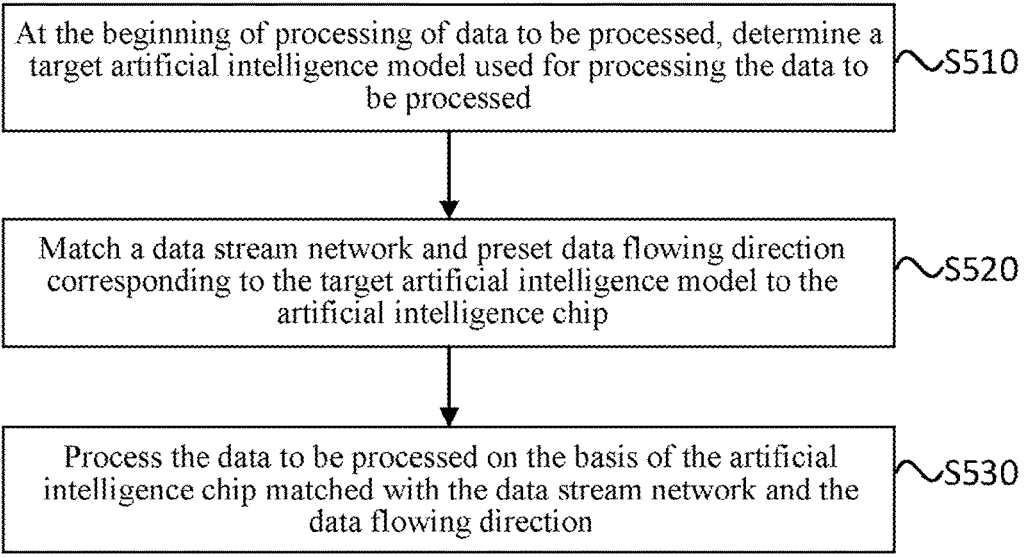
FIG. 6 is a flow diagram of a data processing method based on an artificial intelligence chip provided by Embodiment 2 of the present disclosure.

FIG. 6 is a flow diagram of a data processing method based on an artificial intelligence chip provided by Embodiment 2 of the present disclosure, which can be applied to a scenario of data processing on an artificial intelligence chip. The method can be implemented by an artificial intelligence chip provided in any embodiment of the present disclosure.

As shown in FIG. 6, the data processing method based on an artificial intelligence chip provided by Embodiment II of the present disclosure includes:

S510, at the beginning of processing of data to be processed, a target artificial intelligence model used for processing the data to be processed is determined.

The data to be processed can be image data, voice data, text data, and the like. There is no specific limitation here. The target artificial intelligence model refers to an artificial intelligence learning module configured to perform processing on the basis of the data to be processed. Specifically, the target artificial intelligence module corresponds to a data type corresponding to the data to be processed. For example, when the data to be processed is image data, the target artificial intelligence model is a CNN model. When the data to be processed is text data, the target artificial intelligence model is an RNN model.

S520, a data stream network and a preset data flowing direction corresponding to the target artificial intelligence model are matched to the artificial intelligence chip.

The data stream network refers to a composition of various modules that adapt to an algorithm corresponding to the target artificial intelligence model and configured to achieve the complete computation of the target artificial intelligence model. The preset data flowing direction refers to a flowing direction of the data to be processed in the data stream network. Specifically, a data stream refers to an ordered sequence of points that can be read once or a few times. According to the predefined data flowing direction, the data stream flows in the data stream network according to the data flowing direction, and is read by computing modules for processing. Artificial intelligence chips of this embodiment include but are not limited to a Field Programmable Gate Array (FPGA) chip, a CAISA chip, and the like.

S530, the data to be processed is processed on the basis of the artificial intelligence chip matched with the data stream network and the data flowing direction.

In this step, when the data stream network and the data flowing direction corresponding to the target artificial intelligence model are matched, the artificial intelligence chip can process the data to be processed on the basis of the data stream network and the preset data flowing direction. Specifically, the data to be processed flows in the data stream network according to the data flowing direction. The data stream network includes a plurality of computing modules for computation according to the algorithm corresponding to the target artificial intelligence model. When the data reaches the computing modules, the computing modules use the data for computation.

In one optional implementation, the step that a data stream network and a preset data flowing direction corresponding to the target artificial intelligence model are matched to the artificial intelligence chip may include:

algorithm information corresponding to the target artificial intelligence model is determined; and the data stream network and the data flowing direction corresponding to the target artificial intelligence model are matched to the artificial intelligence chip according to the algorithm information.

The algorithm information refers to information related to the algorithm corresponding to the target artificial intelligence model.

Optionally, the algorithm information includes computing content, input/output information and an operation order; and the step that the data stream network and the data flowing direction corresponding to the target artificial intelligence model are matched to the artificial intelligence chip according to the algorithm information includes:

a data stream module is matched according to the computing content, the data stream module at least including a computing module; a connection relationship of the data stream module is matched according to the input/output information to form the data stream network; and the data flowing direction of the data to be processed in the data stream network is matched according to the operation order.

The computing content refers to computations involved in processing according to artificial intelligence algorithms, such as convolutional computation and pooling computation. The data stream module at least includes the computing modules. When the bandwidths of the computing modules for data interaction do not match, a local data stream storage module is also included. The input/output information refers to information of input data and output data of each computing module, and the connection relationship of the data stream module can be matched according to the input/output information. The data flowing direction of the data in the data stream network can be determined according to the operation order of the artificial intelligence algorithms.

It should be noted that the data stream network and the data flowing direction can be automatically mapped in the artificial intelligence chip according to the artificial intelligence algorithms, and a user can easily use the artificial intelligence chip of this embodiment of the present disclosure to perform corresponding processing, with extremely high usability.

It can be understood that by means of processing the data to be processed on the basis of the artificial intelligence chip matched with the data stream network and the data flowing direction, the instruction overhead is reduced, and the resource utilization rate of the artificial intelligence chip is increased. In addition, the artificial intelligence chip predefines the corresponding computing functions of the multiple computing modules, and the multiple computing modules are combined to form different data stream networks to execute different artificial intelligence algorithms. The setting can be performed as required to support various artificial intelligence algorithms, thus realizing the universality of the data stream artificial intelligence chip.

According to the technical solution of this embodiment of the present disclosure, at the beginning of processing of data to be processed, a target artificial intelligence model used for processing the data to be processed is determined; a data stream network and a preset data flowing direction corresponding to the target artificial intelligence model are matched to the artificial intelligence chip; and the data to be processed is processed on the basis of the artificial intelligence chip matched with the data stream network and the data flowing direction. The technical effect of improving the file retrieval efficiency is achieved. In addition, the artificial intelligence chip pre-defines the corresponding computing functions of the multiple computing modules, and the multiple computing modules are combined to form different data stream networks to execute different artificial intelligence algorithms. The setting can be performed as required to support various artificial intelligence algorithms, thus realizing the universality of the data stream artificial intelligence chip.

What is claimed is:

1. An artificial intelligence chip, comprising:
a plurality of computing modules, each computing module being configured to process data on a basis of one of operation nodes corresponding to artificial intelligence algorithms, and the plurality of computing modules being connected in turn according to an operation order of the artificial intelligence algorithms;
wherein the data flows, according to a preset data flowing direction, in a data stream network formed by the plurality of computing modules;
the artificial intelligence chip further comprises a data stream dam, wherein the data stream dam is arranged between a previous computing module and a next computing module among the plurality of computing modules, and is used for receiving first data output by the previous computing module when a bandwidth of the previous computing module does not match a bandwidth of the next computing module, and sending the first data to the next computing module according to a bandwidth matched with the bandwidth of the next computing module;
wherein the data stream dam comprises a write end, a read end, a full-load end and a no-load end, and further comprises:
a first AND gate, connected with the write end to represent an uplink valid end, the uplink valid end being configured to receive a first valid signal sent by the previous computing module;
a second AND gate, connected with the read end to represent a downlink permission end, the downlink permission end being configured to receive a second valid signal sent by the next computing module;
a first NOT gate, connected with the full-load end to represent an uplink permission end, the uplink permission end being configured to send a first permission signal to the previous computing module and the first AND gate; and
a second NOT gate, connected with the no-load end to represent a downlink valid end, the downlink valid end being configured to send a second valid signal to the next computing module and the second AND gate.

2. The artificial intelligence chip according to claim 1, wherein the previous computing module and the next computing module are adjacent or not adjacent.

3. The artificial intelligence chip according to claim 1, further comprising:
a local data stream storage module, the local data stream storage module being at least connected with a first computing module and a last computing module among the plurality of computing modules, and configured to send the data to the data stream network for processing by means of the first computing module, and/or receive a processing result output by the last computing module.

4. The artificial intelligence chip according to claim 1, wherein the data stream network is a local data stream network; there are a plurality of local data stream networks; the plurality of local data stream networks form one global data stream network; and the artificial intelligence chip further comprises:
a global data stream storage module, the global data stream storage module being connected with the plurality of local data stream networks; and the global data stream storage module being configured to transmit data to the local data stream networks or transmit second data output by a previous local data stream network to a next local data stream network.

5. The artificial intelligence chip according to claim 4, wherein there is one global data stream storage module; and the plurality of local data stream networks are respectively connected with the global data stream storage module.

6. A data processing method based on an artificial intelligence chip, applied to the artificial intelligence chip according to claim 1, the method comprising:
at a beginning of processing of data to be processed, determining a target artificial intelligence model used for processing the data to be processed;
matching a data stream network and a preset data flowing direction corresponding to the target artificial intelligence model to the artificial intelligence chip;
processing the data to be processed on the basis of the artificial intelligence chip matched with the data stream network and the data flowing direction.

7. The method according to claim 6, wherein the step of matching a data stream network and a preset data flowing direction corresponding to the target artificial intelligence model to the artificial intelligence chip comprises:
determining algorithm information corresponding to the target artificial intelligence model; and
matching, according to the algorithm information, the data stream network and the data flowing direction corresponding to the target artificial intelligence model to the artificial intelligence chip.

8. The method according to claim 7, wherein the algorithm information comprises computing content, input/output information and an operation order; and the step of matching, according to the algorithm information, the data stream network and the data flowing direction corresponding to the target artificial intelligence model to the artificial intelligence chip comprises:
matching a data stream module according to the computing content, the data stream module at least comprising a computing module;
matching a connection relationship of the data stream module according to the input/output information to form the data stream network; and
matching the data flowing direction of the data to be processed in the data stream network according to the operation order.

* * * * *